(12) United States Patent
Yu et al.

(10) Patent No.: US 8,337,609 B2
(45) Date of Patent: Dec. 25, 2012

(54) BLACK PEARLESCENT PIGMENT WITH A METAL LAYER

(75) Inventors: Shufang Yu, Orefield, PA (US); Peter Llyod Redmond, New Ringgold, PA (US); Hai Hui Lin, Naperville, IL (US); Chang Xu, Macungie, PA (US); Parfait Jean Marie Likibi, Mount Pleasant, SC (US)

(73) Assignee: Silberline Manufacturing Co., Inc., Tamaqua, PA (US)

(*) Notice: Subject to any disclaimer, the term of this patent is extended or adjusted under 35 U.S.C. 154(b) by 0 days.

(21) Appl. No.: 12/628,779

(22) Filed: Dec. 1, 2009

(65) Prior Publication Data
US 2011/0126735 A1    Jun. 2, 2011

(51) Int. Cl.
C09C 1/00 (2006.01)
C04B 14/00 (2006.01)
B32B 5/16 (2006.01)
B32B 9/00 (2006.01)
B32B 15/02 (2006.01)
B32B 19/00 (2006.01)
B05D 3/04 (2006.01)
B05D 1/18 (2006.01)

(52) U.S. Cl. ........ 106/400; 106/415; 427/304; 427/437; 428/402

(58) Field of Classification Search ............ 106/415, 106/417, 440, 480; 428/402; 427/304, 437
See application file for complete search history.

(56) References Cited

U.S. PATENT DOCUMENTS

| | | | |
|---|---|---|---|
| 3,954,473 A * | 5/1976 | Lambert | 430/393 |
| 5,116,664 A | 5/1992 | Kimura et al. | |
| 5,308,394 A | 5/1994 | Minohara et al. | |
| 6,325,847 B1 | 12/2001 | Christie et al. | |
| 6,440,208 B1 | 8/2002 | Christie et al. | |
| 6,500,251 B1 | 12/2002 | Andes et al. | |
| 6,582,764 B2 * | 6/2003 | Fuller et al. | 427/217 |
| 6,599,355 B1 | 7/2003 | Schmidt et al. | |
| 6,648,957 B1 * | 11/2003 | Andes et al. | 106/415 |
| 6,783,584 B2 | 8/2004 | Takahashi | |
| 6,794,037 B2 | 9/2004 | Zimmermann et al. | |
| 6,800,125 B2 | 10/2004 | Zimmermann et al. | |
| 6,821,333 B2 | 11/2004 | Zimmermann et al. | |

(Continued)

FOREIGN PATENT DOCUMENTS

EP    1 672 037    6/2006

(Continued)

OTHER PUBLICATIONS

Extended European Search Report for application No. 10193355.4, dated May 16, 2011 (6 pages).

*Primary Examiner* — Pegah Parvini
(74) *Attorney, Agent, or Firm* — Hamre, Schumann, Mueller & Larson, P.C.

(57) ABSTRACT

A pearlescent effect pigment having an opaque, dark or black color is disclosed. The black pearlescent pigment includes a platelet-shaped non-metal substrate, optionally an oxide layer, a template layer, and a metal layer. The pearlescent luster of the disclosed effect pigment is comparable to those of pure pearlescent effects. The disclosed method provides a cost-effective approach for the manufacturing of the disclosed effect pigment.

21 Claims, 2 Drawing Sheets
(1 of 2 Drawing Sheet(s) Filed in Color)

U.S. PATENT DOCUMENTS

| | | |
|---|---|---|
| 7,160,374 B2 * | 1/2007 | Umehara et al. ............ 106/31.6 |
| 7,226,503 B2 | 6/2007 | Anselmann et al. |
| 2004/0115432 A1 | 6/2004 | Zimmermann et al. |
| 2008/0210123 A1 | 9/2008 | Kniess et al. |
| 2008/0249210 A1 | 10/2008 | Entenmann et al. |
| 2009/0017082 A1 | 1/2009 | Morimitsu et al. |
| 2009/0054534 A1 | 2/2009 | Kitamura |
| 2009/0056591 A1 | 3/2009 | Schmidt et al. |
| 2009/0176089 A1 | 7/2009 | Huber et al. |
| 2009/0252772 A1 | 10/2009 | Henglein et al. |

FOREIGN PATENT DOCUMENTS

| | | |
|---|---|---|
| EP | 1 990 377 | 11/2008 |
| KR | 10-2009-0064381 | 6/2009 |
| WO | 01/92359 | 12/2001 |

* cited by examiner

BLACK PEARLESCENT PIGMENT WITH A METAL LAYER

FIELD

This disclosure generally relates to pigments, and particularly, to the design of coated pigments and methods of producing the coated pigments.

BACKGROUND

Effect pigments having a sequence of interference layers applied to a transparent substrate are generally known as pearlescent pigments. The transparent substrate can include natural or synthetic mica, glass flakes, or metal oxides with a platelet shape. Mica, which is inexpensive, readily available and easy to cleave into smooth and thin platelets, is commonly used. In addition, pigments based on mica are stable towards chemical or thermal treatment.

Various techniques have been developed to create color/luster effects. One approach to making these pigments is to coat a platelet substrate with a high refractive index metal oxide layer such as $TiO_2$, $Fe_2O_3$, and $Zr_2O_3$ or with alternating layers of high and low refractivity as described in U.S. Pat. No. 6,599,355, U.S. Pat. No. 6,500,251 and U.S. Pat. No. 6,648,957.

The use of a metal particle layer as a reflective layer also has been disclosed. For example, U.S. Pat. No. 5,116,664 discloses a titanium-mica composite material comprising mica, a first coating composed of titanium dioxide, and a second coating composed of powder particles of at least one metal selected from the group consisting of cobalt, nickel, copper, zinc, tin, gold and silver.

U.S. Pat. No. 6,794,037 is directed to a high chroma effect material comprising a platelet substrate encapsulated with a layer of silver as light reflective layer, then a spacer layer of metal oxide, nitride, fluoride, and finally an iron oxide layer.

U.S. Pat. No. 6,440,208 discloses a color effect material wherein the platelet substrate is coated first with a light reflective layer selected from the group consisting of copper, zinc, an alloy of copper, and an alloy of zinc, then with a second layer of silicon dioxide or magnesium fluoride, and then a third layer that is selectively transparent to light.

U.S. Pat. No. 6,325,847 describes precious metal color effect materials where a platelet substrate is encapsulated with a reflective precious metal layer, a second layer of silicon dioxide or magnesium fluoride and also with a selective transparent third layer.

U.S. Pat. No. 7,226,503 relates to an effect pigment comprising a glass flake with a thickness of ≦1.0 μm coated with one or more layers of metal oxides, metal suboxides, metal oxyhalides and metal fluorides etc.

U.S. Pat. No. 5,308,394 discloses a pigment that includes a light-transparent ceramic scaly substrate, a thin compound layer coated on a surface of the substrate, a rutile layer titanium dioxide layer formed on a surface of the substrate coated with a tin compound, a metal compound layer coated on a surface of the titanium dioxide layer, the metal compound being at least one selected from the group consisting of Bi, Sb, As, Cd, Mn, Pb and Cr, and metallic glossy dots formed on the surfaces in a scattering manner.

U.S. Pat. No. 6,800,125 discloses an oxide metallic color effect material comprising a platelet-shaped substrate encapsulated with a light reflective silver layer, followed by a layer of iron oxide.

U.S. Pat. No. 6,582,764 discloses a hybrid inorganic/organic color effect material that includes a platelet substrate core coated with a first layer which acts as a reflector to light directed thereon. The first layer can include an alloy of copper and zinc, an alloy of aluminum and copper, an alloy of aluminum and zinc, copper or zinc. The material further includes a second organic polymer layer, and a selectively transparent third layer.

U.S. Pat. No. 6,821,333 discloses a color effect material comprising a platelet-shaped substrate encapsulated with a highly reflective layer of metal selected from silver, gold, platinum, palladium, rhodium, ruthenium etc, a spacer layer of metal oxide, nitride, fluoride or carbide or polymer, and an outer layer selected from metals or metal oxides.

U.S. Pat. No. 6,582,764 is directed to a hybrid/organic color effect material that includes a platelet-shaped substrate encapsulated with three layers. The first layer includes either an alloy of copper and zinc, an alloy of aluminum and copper, or an alloy of aluminum and zinc. The second layer is an organic layer and encapsulates the first layer. The third layer is a selectively transparent layer.

All these pearlescent pigments have an interference color effect and a luster effect. However, the hiding power of such pearlescent pigments is so small that an underlayer cannot be sufficiently covered. Thus, the pigments are either transparent or semi-transparent. Moreover, when such pigments are subjected to a colorimetric appraisal using the CIE lab color space system, the pigments do not exhibit a black color effect while maintaining a pealescent luster effect.

CIElab values are measured with a Multi-angle Spectrophotometer at different angles of 15°, 25°, 45°, 75° and 110°. The reported color coordinates (L, a*, b*) are related to lightness (L) and color (a* and b*). The a* is the red/green content and b* is the blue/yellow content. If a pigment has a low L value with a* and b* values close to zero at a certain angle, this means that the pigment is black at that angle. Further, if the same pigment has a very high lightness (L) value at different angles, this means that the pigment has high light travel property.

Blackness (also called Jetness) can be evaluated using a color dependent black value Mc. Mc is the best jetness parameters so far, and correlates well with the human perception of increased jetness. As Mc increases, the jetness of the masstone inceases. Mc is calculated from tristimulus value of illuminating light source (Xn, Yn, Zn) and the reflected light of sample (X, Y, Z), based on the following equations:

$$L=116(Y/Yn)^{1/3}-16$$

$$a^*=500[(X/Xn)^{1/3}-(Y/Yn)^{1/3}]$$

$$b^*=200[(Y/Yn)^{1/3}-(Z/Zn)^{1/3}]$$

$$Mc=100[\log(Xn/X)-\log(Zn/Z)+\log(Yn/Y)].$$

An Mc value of 150 or higher is considered highly jet.

Pigments with black color especially at flop angle with high light travel exhibiting high jetness have been widely demanded. Although carbon can be blended so as to create a black effect, such an addition decreases the pearlescent luster effect significantly.

Efforts have been made to obtain dark color effects. U.S. Pat. No. 5,753,024 for example discloses grey pigments that include a substrate coated with tin oxide and at least one further metal oxide and further coated with organic colloids that are calcined at temperatures of 900-1100° C. Silver-grey semi-transparent color pigments having mica coated with titania, ferric oxide and tin oxide are known. Black olive semi-transparent pigments that are based on mica and coated with cobalt iron oxide and cobalt oxide are also known. Such pigments have a brown undertone color. However, the above pigments have an undesirable undertone and do not have good hiding power.

SUMMARY

A pearlescent effect pigment having an opaque, dark or black color is disclosed. The pearlescent luster of the disclosed effect pigment is comparable to those of pure pearlescent effects. The disclosed method provides a cost-effective approach for the manufacturing of the disclosed effect pigment.

In one embodiment, the dark or black pearlescent pigment includes a platelet-shaped non-metallic reflector core, an oxide layer, a template layer, and a metal layer. In one example, the template layer permits a substantially uniform and smooth coated surface to be formed. In one implementation, the template layer includes an organic layer. In one instance, the template layer is an organic polymer layer grown via Atomic Transfer Radical Polymerization (ATRP). In another instance, the template layer is an organic monolayer.

In another example, the template layer is coated with a metal layer. The metal layer is substantially continuous. In one implementation, the metal layer is formed by electroless deposition. In this instance, the template layer includes amine groups that contribute to the formation of high density catalyzing sites. In one example, the high density catalyzing sites permit the metal layer to be uniform and continuous so as to create opacity. In one implementation, the amine groups provide metal-ion complexing sites for sensitizing the substrate. The metal-ion-sensitized surface of the substrate provides strong absorption of the catalyst layer to the substrate during the activating pretreatment for the electroless deposition.

In one embodiment of the method of producing the dark or black pearlescent pigment, the method includes forming a catalyst layer in-situ on the surface of a substrate and depositing a metal layer on the catalyst layer. In one example, depositing a metal layer involves electroless deposition, wherein an activation of the sensitized substrate and reduction of the metal salts are a one-step reaction.

The products of the present disclosure are useful in automotive, cosmetics, industrial or any other application where pearlescent pigment can be used.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A is the image of white pearlescent pigment surface before coating. FIG. 2B is the surface after multilayer coating.

DETAILED DESCRIPTION

A coated pigment including a non-metal substrate, an oxide layer, a template layer, and a metal layer and a method of producing the coated pigment are described. The disclosed coated pigment has a dark or black undertone and has an outstanding hiding property.

Figure 1A:
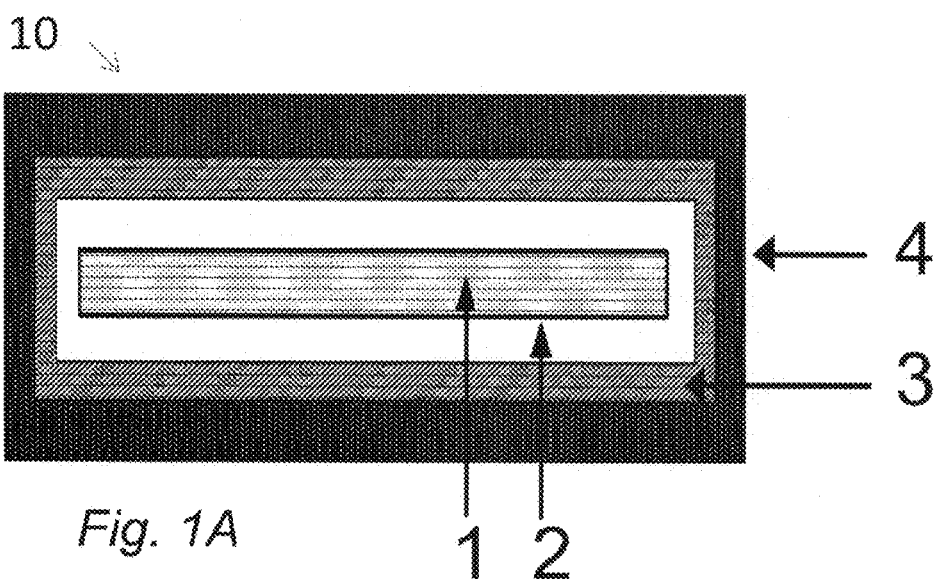
FIGS. 1A and 1B illustrate embodiments of the disclosed coated pigment.

With reference to FIG. 1A, a coated pigment 10 includes a substrate 1. In one example, the substrate 1 can be an encapsulatable platelet. The size of the encapsulatable platelet 1 can have any size that is suitable for forming an effect pigment. In one implementation, the encapsulatable platelet 1 has a diameter in the range of 5 µm to 700 µm, and a thickness of 5 nm to 500 nm. The diameter and thickness can be measured using, for example, Field Emission Scanning Electron Microscopy (FESEM). In this instance, the diameter is measured as viewed in cross-sectional top view of the platelet, and the thickness is measured as viewed in cross-sectional side view of the platelet.

In one example, the substrate 1 is a non-metal substrate. The term "metal" herein means that the oxidation state of the element metal present in the substrate is zero. The term "non-metal" herein means that the oxidation state of the element present in the substrate is other than zero.

In one instance, the substrate 1 can be formed of any material that is suitable for forming an effect pigment, including, but not limited to, glass, silicon oxide, and titanium dioxide-coated mica. In another instance, the substrate 1 includes an oxide layer, which can include, but is not limited to, metal oxides such as $SiO_2$, $TiO_2$ and $ZrO_2$.

The substrate 1 is coated with a first layer 2. In one example, the first layer 2 is an oxide layer. The oxide layer 2 can include, but is not limited to, metal oxides such as $SiO_2$, $TiO_2$ and $ZrO_2$. In one implementation, the oxide layer 2 is part of a white pearlescent, which is mica that is coated with $TiO_2$. In one example, the thickness of the first layer 2 has a range from a few nm to tens of nm.

The first layer 2 is further coated with a second layer 3. In one example, the second layer 3 is a template layer. In one instance, the template layer 3 is an organic monolayer. The term "organic monolayer" herein means a layer that includes molecules with an organic chain. In one example, the organic monolayer 3 includes an aminosilane monolayer and is provided by silanization. Examples of the aminosilane that can be utilized include gamma-aminopropyl trimethoxysilane, γ-aminopropyl triethoxysilane, N-(2-aminoethyl)-3-aminopropyltrimethoxysilane, gamma-(2-aminoethyl)aminopropylmethyldimethoxysilane, and the like which contains amino group in the chain or at the end of the chain. The amino group can be a primary amine, secondary amine or tertiary amine. In one instance, the amount of the aminosilane included is in a range of 0.1 to 20% by weight based on the weight of the starting substrate. In another instance, the amount of the aminosilane included is in a range of 1 to 50% by weight based on the weight of the starting substrate. In yet another instance, the amount of the aminosilane included is in a range of 1 to 20% by weight based on the weight of the starting substrate. In yet another instance, the amount of the aminosilane included is in a range of 1 to 10% by weight based on the weight of the starting substrate.

In another embodiment, the template layer 3 is an organic polymer layer. The organic polymer layer 3 can include polystyrene (PS), polymethylmetacrylate (PMMA), polymethacrylate (PMA), 2-hydroxy ethyl methacrylate, glycidyl methacrylate, and/or dimethylamino ethyl methacrylate.

In one example, the organic polymer layer 3 is formed by immobilizing initiator molecules onto the surface of the first layer 2. In one implementation, the initiator includes a surface active group and an initiator moiety and the surface of the first layer 2 includes a functional group. The initiator molecule is immobilized by reacting the surface active group of the initiator molecule with the functional group on the surface of the first layer 2. Then, the immobilized initiator molecule is reacted with one or more polymerizable monomers so that monomers are added to the initiator moiety and form a polymer chain attached to the surface of the first layer 2. In one instance, the organic polymer layer 3 is grown via atomic transfer radical polymerization (ATRP).

In yet another example, the polymer chains within the organic polymer layer 3 are substantially uniform in length such that the organic polymer layer 3 has a substantially uniform thickness. In one instance, the organic polymer layer 3 has a substantially uniform thickness as viewed by Transmission Electron Microscopy (TEM). In this instance, the thickness of the organic polymer layer 3 can be in a range from a few nanometers to 100 nm and have a standard deviation of less than 15% of the average thickness as measured using a transmission electron microscope at a magnification between ×20,000 and ×100,000.

In another implementation, the thickness of the organic polymer layer 3 can be increased or decreased by increasing or decreasing the reaction time, respectively. In yet another implementation, the thickness of the organic polymer layer 3 can be increased or decreased by increasing or decreasing the reaction temperature, respectively. In still yet another implementation, the thickness of the organic polymer layer 3 can be increased or decreased by increasing or decreasing the monomer concentration, respectively.

In yet another example, the template layer 3 includes an amino group. The amino group can be a primary amine or secondary amine. In the case where the template layer 3 is the organic polymer layer, the amino group is provided by growing a hydrophilic coating layer on the polymer chain ends after a desired length of the initial polymer chains is achieved. In one example, the hydrophilic layer includes poly(dimethylaminoethyl methacrylate).

Figure 1B:
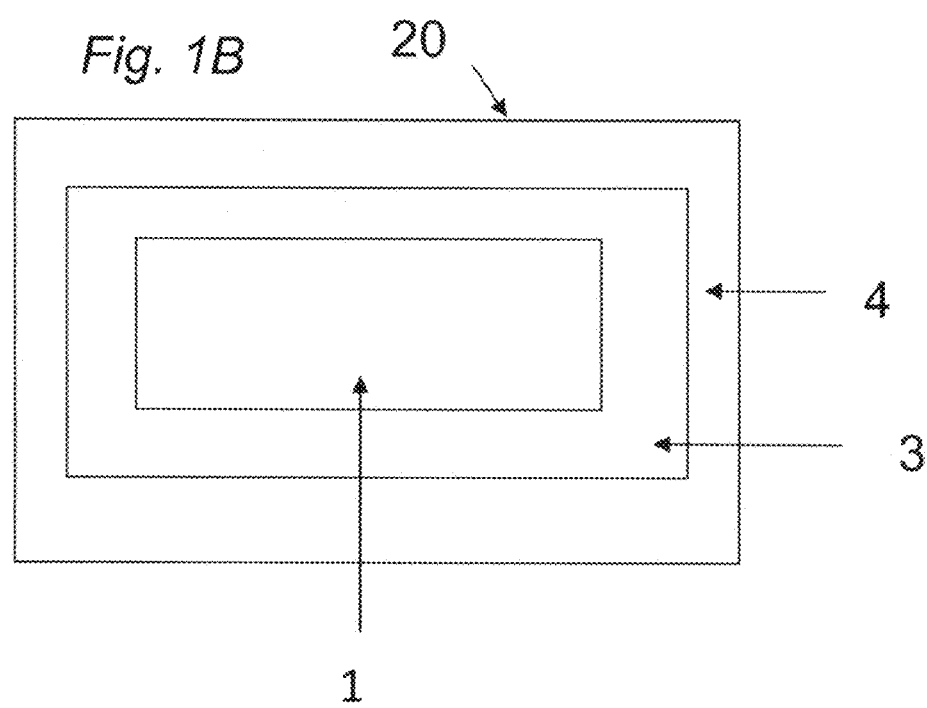

With reference to FIG. 1B, in another embodiment, a coated pigment 20 does not include an oxide layer. In one example, the substrate 1 of the coated pigment 20 includes hydroxyl groups. In this instance, the substrate 1 is directly coated with the second layer 3. In one implementation, the substrate 1 is a glass flake.

With reference to FIGS. 1A and 1B, the second layer 3 is further coated with a third layer 4. In one embodiment, the third layer 4 is a metal layer. The metal layer 4 can include silver, copper or nickel. In one instance, Auger electron microscopy (AES) mapping can be used to determine the coverage of the metal layer 4. In one example, the coverage of the metal layer 4 is substantially continuous, such that an AES map for a metal within metal layer 4 does not reveal discontinuity in the coverage of the metal layer 4 at a magnification of ×7500 and a scanned area of 15 μm×15 μm using 256 pixel×256 pixel density. Here, the term "substantially continuous" means that Auger Electron Microscopy at the given magnification for the scanned area of ×7500 and 15 μm×15 μm using 256 pixel×256 pixel density, respectively, cannot resolve discontinuity of the metal layer 4 such that discrete metal particles are not observed.

The metal layer 4 can be formed on the second layer 3 by any surface-covering techniques suitable for depositing a metal on the second layer 3. In one example, the metal layer 4 is plated by electroless deposition.

Generally, electroless metal deposition involves the use of a chemical reducing agent to plate a metal from a solution. The electroless deposition technique allows one to control the thickness of the coating. One useful plating technique of this type is to arrange the chemistry such that the kinetics of homogeneous electron transfer from the reducing agent to the metal ion are slow within the electroless-plating bath so as to prevent the metal ion from being reduced in the bulk solution. A catalyst that accelerates the rate of metal ion reduction is then applied to the surface to be coated. In this way, metal ion is reduced only at the surface, and the surface becomes coated with the desired metal. The metal can be deposited from reduction of aqueous salts of the metals.

In one example, the metal layer 4 is formed by reducing a water-soluble metallic salt. The metallic salt that can be utilized include silver sulfates, silver hydrochlorides, silver nitrates, silver carbonates etc., copper sulfate, copper hydrochlorides, copper nitrates, copper carbonates etc., and nickel sulfate, nickel hydrochlorides, nickel nitrates, nickel carbonates etc.

In yet another example, before the metal layer 4 is formed on the second layer 3 by electroless deposition with water-soluble metallic salt, the surface of the second layer 3 is activated by a pretreatment. In one instance, the pretreatment is a sensitizing-activating treatment that forms a catalyst layer on the surface of the second layer.

In one implementation, a sensitizing solution including a metal ion is utilized. In one example, the metal ion utilized is Sn(II). In this instance, the amine groups included within the second layer 3 act as "molecular anchors" that bond the Sn(II) to the surface of the second layer 3, thereby sensitizing the surface of the second layer 3. Once the surface of the second layer 3 is sensitized, the surface is activated by immersion in an aqueous solution of metallic salt containing Ag, Pd or Pt. This causes a redox reaction in which the surface is coated with discrete, nanoscopic Ag, Pd or Pt particles. These particles provide catalytic sites and together form a catalyst layer including Ag, Pd or Pt nuclei. Thereafter, the metal layer 4 can be formed on the surface of this catalyst layer by electroless plating. In particular, as described above, when the catalyst layer is exposed to an electroless plating solution, a reducing agent in the plating solution is oxidized on the surface of the catalyst layer due to catalytic activity. Metallic salts in the electroless plating solution are then reduced by the emitted electrons, the metal is deposited on the surface of the catalyst layer only, and the continuous metal layer 4 is formed.

In one example, forming the catalyst layer and depositing the metal layer are a one-step reaction.

In one embodiment, the disclosed coated pigment has a dark or black color such that when the CIElab values of the disclosed coated pigment are measured using a X-rite MA68II Multi-angle Spectrophotometer at different angles of 15°, 25°, 45°, 75°, 110°, the a* and b* values are close to zero at the measured angles. In one instance, the a* and b* values are 0.26 and −0.06, respectively, at 110° and 1.87 and −3.17, respectively, at 15°.

In another embodiment, the disclosed coated pigment exhibits extreme light travel such that when the CIElab values of the disclosed coated pigment are measured using a X-rite MA68II Multi-angle Spectrophotometer at different angles of 15°, 25°, 45°, 75°, 110°, the lightness (L value) is very high at the measured angles. In one instance, the L value is up to 99.62 at 15° angle and the L value is 5.17 at an angle of 110°.

In yet another embodiment, the disclosed coated pigment has high jetness such that when the disclosed coated pigment is evaluated using a color dependent black value Mc, the Mc value is over 150 at angles of 75° and 110°.

EXAMPLES

Example 1

Monolayer as Template Layer Attachment 20 g of $TiO_2$-coated (anatase) mica with a particle size of 10-60 μm (D50=19 μm according to Malvern particle size analysis) were dispersed in 500 mL glycol ether PM with stirring and after 5 minutes, 1% of γ-aminopropyl trimethoxysilane on $TiO_2$-coated mica by weight was added into the dispersion and stir for 10 minutes, then 1% of water was added as catalyst with stirring at room temperature. After two hours, the slurry was filtered and washed with glycol ether PM initially followed by water.

Example 2

Monolayer as Template Layer Attachment

Example 1 was repeated except that 10% of N-(2-aminoethyl)-3-minopropyltrimethoxysilane and 10% of water were added.

Example 3

Polymer Layer as Template Layer Attachment

Step 1—Functionalize $TiO_2$-Coated Mica with ATRP Initiator

The reaction was carried out in the fumehood, using a 500 mL round bottom flask equipped with a magnetic stirring bar and a condenser.
The following chemicals were added to the reaction flask:

| | |
|---|---|
| 37.5 g | $TiO_2$-coated mica |
| 0.3 mL | 3-(trimethoxysilylpropyl)-2-bromo-2-methylpropionate |
| 300 mL | Toluene. |

The reaction mixture was heated and was kept under reflux for 18 hours. Once the reaction time was complete, the mixture was cooled down to room temperature. The flakes were vacuum filtered. Three washes of toluene (200 mL) were applied.
Step 2—Surface-Initiated Polymerization of Styrene and Diemthylaminoethyl Methacrylate The following reaction was carried out in the fumehood, using a 100 mL reaction flask equipped with a mechanical stirrer and a heating mantle.
To the reaction flask, a stir bar and the following reagents were added:

| | |
|---|---|
| CuBr | 0.25 g |
| Styrene | 40 mL |
| TiO2-coated mica from step 1 | 6.38 g (containing 4 g of NV) |
| Toluene | 40 mL. |

The flask was sealed with a rubber septum and degassed with $N_2$ and then the solution was heated to 60° C. In a separated flask, pentamethyldiethylenetriamine (PMDETA) was degassed with nitrogen for 30 min. Then, 0.37 mL of degassed PMDETA was transferred to the reaction flask with an $N_2$ purged syringe. The solution was kept at 60° C. for 1 hour before 40 mL of reaction mixture was withdrawn from the reaction mask. After 1.5 hours of polymerization, 37 mL of degassed dimethylaminoethyl methacrylate was transferred to the reaction flask with $N_2$ purged syringe. The reaction mixture was kept at 60° C. for an additional 1 hour before the reaction was stopped by cooling the reaction flask to room temperature. The pigments were separated from the reaction mixture via centrifugation.

Example 4

Silver Layer Coating on White Pearlescent Pigments

Step 1—Monolayer as Template Layer Attachment
  Same as Example 1.
Step 2—Pretreatment of Template Layer-Coated Pigment
  Template layer-attached white pearlescent pigments from step 1 was dispersed in a solution of 2.5 g $SnCl_2$ and 2.5 mL HCl in 500 mL water and kept stirring for 20 min pretreatment, and then filtered.
Step 3—Silver Layer Coating
  The following solutions were used:
  Solution A—5 g $AgNO_3$ was dissolved in 50 mL water, $NH_4OH$ 10 mL was added, then more water was added to make a total volume of 200 mL;
  Solution B—7.5 g of sodium potassium tartrate was dissolved in 200 mL water.
  The filtered pigment from step 2 was dispersed into 200 mL water and transferred to 2 L reactor equipped with stirring and temperature control. The slurry was stirred at 350 rpm. To the slurry, solution A was first added and was allowed to sit for 5 minutes. A light brown color was observed. Then, solution B was added and stirred at 350 rpm. The temperature was set at 50° C. first for 30 min, then increased to 60° C. The total reaction time was 2.5 hours. Then the slurry was cooled down to room temperature, filtered, and thoroughly washed with water, and then washed with isopropyl alcohol once and was air dried. The resulting powder was black.

Example 5

Step 1

Monolayer as Template Layer Attachment

Similar to example 1, except 50 g of white pearlescent pigments was dispersed in 1000 mL glycol ether PM.

Step 2

Pretreatment of Template Layer-Coated Pigment

Template layer-attached white pearlescent pigments from step 1 was dispersed in a solution of 6.25 g $SnCl_2$ and 6.25 mL HCl in 1000 mL water and stirred for a 30 min pretreatment, and then filtered and washed with water.

Step 3

Silver Coating

The following solutions were used:
Solution A—12.5 g $AgNO_3$ was dissolved in 50 mL water, $NH_4OH$ 18.75 mL was added, then more water was added to make a total volume of 200 mL
Solution B—18.75 g of sodium potassium tartrate was dissolved in 300 mL water
The filtered pigment from step 2 was dispersed into 500 mL water and transferred to a 2 L reactor equipped with stirring and temperature control. The slurry was stirred at 350 rpm. To the slurry, solution A was first added and allowed to sit for 5 minutes. Once a light brown color was observed, solution B was added and was stirred at 350 rpm. The temperature was set at 30° C. first, then gradually increased by 10° C. every 20 min until reaching 60° C. The total reaction time was 2.5 hours. Then, the slurry was cooled down to room temperature, filtered, and thoroughly washed with water, and then washed with isopropyl alcohol once and air dried. The resulting powder was black.

Example 6

2 g of polymer layer attached white pearlescent pigments from example 3 was dispersed into a solution of 0.5 g $SnCl_2$ and 1.0 mL trifluoroacetic acid in 200 mL water and stirred for 20 min as a pretreatment, and then filtered and washed with water.

The filtered substrate was dispersed into 200 mL water and transferred to 1 L round bottom flask equipped with a magnetic stirring bar and a condenser. While the slurry was stirring, two solutions were made: solution A—0.5 g $AgNO_3$ dissolved in 20 mL water, $NH_4OH$ 1.0 mL was added, then more water was added to make a total volume of 100 mL; solution B—3.0 g of sodium potassium tartrate was dissolved in 100 mL water.

To the above slurry, solution A was first added and allowed to sit for 5 minutes. Once a light brown color was observed, solution B was added and stirred. The temperature was set at 60° C. The total reaction time was 2.5 hours. After the reaction was complete, the slurry was cooled down to room temperature, filtered, and thoroughly washed with water, and then washed with isopropyl alcohol once and air dried. The resulting powder was black.

Example 7

Evaluation of the Black Pigments

Nitrocellulose Ink Drawdown

To evaluate the coloristic of the pigments obtained, in each case 1 g of pigment sample was mixed with nitrocellulose in isopropyl acetate having a solid content 20% by weight and dispersed for 30 second in the Speedmixer (DAC 150 FVZ-K) from FlackTeck Inc. A drawdown bar (#14) was used to prepare drawdowns of the pigmented varnish on a piece of black and white ink cardboard. After the film had dried at room temperature, CIELab values were measured with a X-rite MA68II Multi-angle Spectrophotometer at an angle difference of 15°, 25°, 45°, 75°, 110°. The reported color coordinates (L, a*, b*) related to the standard illuminate D65 and a viewing angle of 10°. L is the lightness, a* is the red/green content and b* is the blue/yellow content. The measurements were carried out on single drawdowns over a white background as shown in Table 1.

TABLE 1

|  | L | a* | b* |
|---|---|---|---|
| Sample from example 4 (Measuring angle) | | | |
| 15° | 91.76 | 1.87 | −3.17 |
| 25° | 61.49 | 1.19 | −1.98 |
| 45° | 25.95 | 1.11 | −0.93 |
| 75° | 9.89 | 0.63 | −0.33 |
| 110° | 6.96 | 0.26 | −0.06 |
| Sample from example 5 (Measuring angle) | | | |
| 15° | 99.62 | 3.29 | 1.17 |
| 25° | 62.01 | 2.13 | 1.28 |
| 45° | 22.67 | 1.83 | 1.14 |

TABLE 1-continued

|  | L | a* | b* |
|---|---|---|---|
| 75° | 7.95 | 1.7 | 1.51 |
| 110° | 5.17 | 1.17 | 1.34 |

The Mc values calculated from the above measurement are shown as in Table 2 below.

TABLE 2

|  | Mc |
|---|---|
| Sample from example 4 (Measuring angle) | |
| 15° | 11.28 |
| 25° | 54.02 |
| 45° | 133.39 |
| 75° | 195.62 |
| 110° | 210.90 |
| Sample from example 5 (Measuring angle) | |
| 15° | −1.20 |
| 25° | 49.62 |
| 45° | 139.46 |
| 75° | 198.56 |
| 110° | 215.09 |

Example 8

Evaluation of the Black Pigments

Refinish Paint System

To evaluate the resulting black pearls from example 4 in a paint system, a solvent-borne acrylic system for both base-coat and clear-coat was used. 8 g of dry black pearls was dispersed in 92 g of base-coat acrylic resin varnish, and then mixed with the same volume of solvent blend thinner. The resulting paint was filtered and sprayed with Siphon on clear ABS plastic chips. The sprayed chips were baked in the oven at 150° F. for 20 minutes. For the following clear coat, three parts of clear-coat acrylic resin varnish was mixed with one part of clear-coat di-isocyanate hardener and one part of solvent blend thinner Then the resulting clear coat was sprayed on the plastic chips, and baked in the oven at 170° F. for 30 minutes. The sprayed and baked coating looked black with very good hiding. Same as in example 7, the CIELab values of chips were measured with a X-rite MA68II Multi-angle Spectrophotometer at an angle difference of 15°, 25°, 45°, 75°, 110° (in Table 3).

TABLE 3

| Sample from example 4 (Measuring angle) | L | a* | b* |
|---|---|---|---|
| 15° | 75.65 | 2.79 | −2.43 |
| 25° | 51.78 | 1.65 | −1.52 |
| 45° | 20.00 | 1.00 | −1.00 |
| 75° | 6.88 | 0.40 | −0.71 |
| 110° | 4.50 | 0.17 | −0.34 |

The correspondent Mc values are shown in Table 4 below.

TABLE 4

| Sample from example 4 (Measuring angle) | Mc |
|---|---|
| 15° | 31.77 |
| 25° | 70.96 |
| 45° | 153.69 |
| 75° | 213.30 |
| 110° | 226.81 |

SEM Image Analysis

Figure 2A:
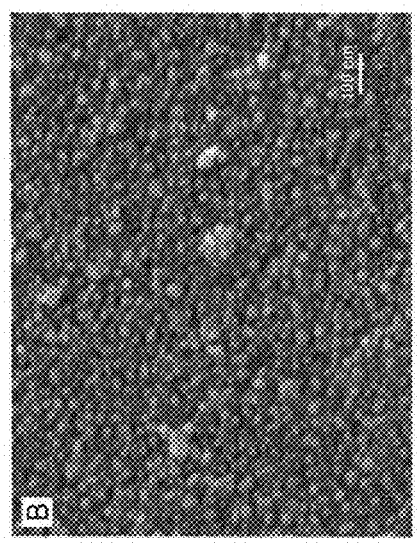
FIGS. 2A and 2B show the SEM image of the effect pigment surface at high magnification (100K).
Figure 2B:
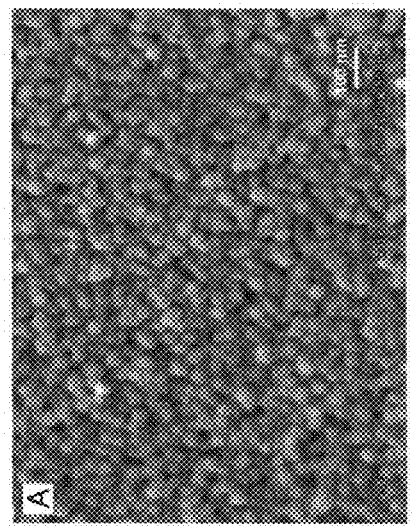

Samples were mounted on an aluminum stub via a piece of double-sided conductive carbon tape using a clean laboratory spatula. The extra power was purged away by nitrogen before introduction into the analytical chamber of SEM. Clean tweezers and gloves were used for all sample handling. The samples were placed in the analytical chamber which was then evacuated to $<1\times10^{-5}$ torr. All microscopy was done at a working distance of 15 mm. FIG. 2A is the SEM image of the white pearlescent pigment surface before coating and FIG. 2B is the SEM image of the surface after multilayer coating.

Auger Electron Microscopy (AES) Mapping

Figure 3:
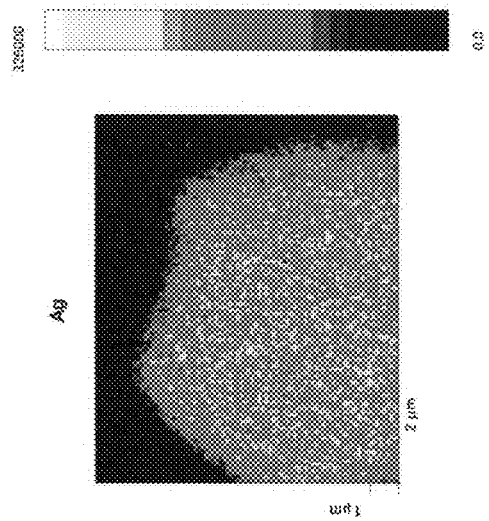
FIG. 3 shows Auger analysis indicating that the Ag layer is continuous.

Suspensions were made from dry powder and cast onto clear Si for analysis. FIG. 3 shows the survey scan of silver of the deposited sample.

While the disclosed coated pigments and methods have been described in conjunction with a preferred embodiment, it will be apparent to one skilled in the art that other objects and refinements of the disclosed coated pigments and methods may be made within the purview and scope of the disclosure.

The disclosure, in its various aspects and disclosed forms, is well adapted to the attainment of the stated objects and advantages of others. The disclosed details are not to be taken as limitations on the claims.

What is claimed is:

1. A coated pigment, comprising:
   a substrate, the substrate being non-metal;
   a template layer that is an organic layer, the substrate being coated by the template layer such that the template layer is in direct contact with the substrate; and
   a metal layer that is substantially continuous, the template layer being coated by the metal layer such that the metal layer is in direct contact with the template layer,
   wherein the template layer includes an amino group that allows the metal layer to be formed as a substantially continuous layer.

2. The coated pigment of claim 1, wherein the coated pigment has a dark or black color.

3. The coated pigment of claim 2, wherein when CIElab values, a* and b*, of the coated pigment are measured using a spectrophotometer relative to a standard illuminant at angles of 15°, 25°, 45°, 75°, 110°, the a* and b* values at the respective angles are close to zero.

4. The coated pigment of claim 3, wherein each of the a* and b* values is less than about 5 at 110° and each of the a* and b* values is less than about 10 at 15°.

5. The coated pigment of claim 2, wherein when CIElab value, L, of the coated pigment is measured using a spectrophotometer relative to a standard illuminant at angles of 15°, 25°, 45°, 75°, 110°, the L value is up to about 115 at 15° angle and the L value is up to about 15 at an angle of 110°.

6. The coated pigment of claim 1, wherein the coated pigment has jetness such that when the disclosed coated pigment is evaluated using a color dependent black value Mc, the Mc value is over 150 at angles of 75° and 110°.

7. The coated pigment of claim 1, wherein the substrate includes an oxide layer.

8. The coated pigment of claim 7, wherein the oxide layer includes at least one selected from the group consisting of titanium dioxide, zirconium dioxide and silicon dioxide.

9. The coated pigment of claim 1, wherein the metal layer includes at least one selected from the group consisting of silver, copper, gold or nickel.

10. The coated pigment of claim 1, wherein the substrate is mica or a glass flake and the coated pigment includes interference layers so as to provide a pearlescent effect that is comparable to those of pure pearlescent effects.

11. The coated pigment of claim a 11, wherein the amino group is a primary amine or secondary amine.

12. The coated pigment of claim 1, wherein the organic layer includes polymer chains that are substantially uniform in length, and the polymer chains are obtained by polymerizing monomers from the surface of the substrate via an initiator moiety that is immobilized to the surface of the substrate so that the initiatory moiety is in direct contact with the surface of the substrate.

13. The coated pigment of claim 12, wherein the organic layer includes dimethylamino ethyl methacrylate.

14. The coated pigment of claim 1, wherein the organic layer includes an aminosilane layer, and the aminosilane layer includes at least one selected from the group consisting of gamma-aminopropyl trimethoxysilane, γ-aminopropyl triethoxysilane, N-(2-aminoethyl)-3-aminopropyltrimethoxysilane, and gamma-(2-aminoethyl)aminopropylmethyldimethoxysilane.

15. The coated pigment of claim 1, wherein an Auger Electron Microscopy for the metal layer does not reveal discontinuity in the coverage of the metal layer at a magnification of ×7500 and a scanned area of 15 μm×15 μm using 256 pixel×256 pixel density.

16. The coated pigment of claim 1, wherein the metal layer is obtained by forming catalytic sites in situ on the surface of the template layer and depositing the metal layer on the template layer.

17. The coated pigment of claim 16, wherein the metal layer is deposited on the template layer using electroless deposition.

18. The coated pigment of claim 16, wherein the formation of the catalytic sites and deposition of the metal layer are a one-step reaction.

19. A coated pigment, comprising:
   a non-metal substrate that includes titanium oxide coated mica;
   an organic layer that includes an aminosilane, the substrate being coated by the organic layer such that the organic layer is in direct contact with the substrate; and
   a metal layer that includes silver, the organic layer being coated by the metal layer such that the metal layer is in direct contact with the organic layer,
   wherein when CIElab values, a* and b*, of the coated pigment are measured using a spectrophotometer relative to a standard illuminant at angles of 15° and 110°, each of the a* and b* values is less than about 5 at 110° and each of the a* and b* values is less than about 10 at 15°.

20. The coated pigment of claim 13, further comprising at least one selected from the group consisting of polystyrene (PS), polymethylmethacrylate (PMMA), polymethacrylate (PMA), 2-hydroxy ethyl methacrylate and glycidyl methacrylate.

21. The coated pigment of claim 1, wherein the non-metal substrate includes titanium oxide coated mica.

\* \* \* \* \*